United States Patent
Noyori et al.

[11] 3,918,058
[45] Nov. 4, 1975

[54] VEHICLE SKID CONTROL SYSTEM

[75] Inventors: Yasumasa Noyori; Mitsuyoshi Horiba, both of Kobe, Japan

[73] Assignee: Fujitsu Limited, Kawasaki, Japan

[22] Filed: May 29, 1973

[21] Appl. No.: 364,557

[30] Foreign Application Priority Data
May 30, 1972  Japan............................ 47-54100

[52] U.S. Cl................................. 343/7 ED; 343/8
[51] Int. Cl.............................................. G01s 9/02
[58] Field of Search............................. 343/7ED, 8

[56] References Cited
UNITED STATES PATENTS

| | | | |
|---|---|---|---|
| 3,118,139 | 1/1964 | Durstewitz | 343/8 |
| 3,277,430 | 10/1966 | Hayemann et al. | 343/8 X |
| 3,448,822 | 6/1969 | LaLone et al. | 343/8 |
| 3,701,568 | 10/1972 | Lewis et al. | 343/8 X |
| 3,726,567 | 4/1973 | Burckhardt | 303/21 F |
| 3,833,906 | 9/1974 | Augustine | 343/8 X |

OTHER PUBLICATIONS
"Doppler Navigation" by J. E. clegy et al., IEEE, Paper No. 2568R, March 1958, pp. 235-247, Copy in 343/8.

*Primary Examiner*—Malcolm F. Hubler
*Attorney, Agent, or Firm*—Daniel Jay Tick

[57] ABSTRACT

A skid control system which successfully prevents a vehicle from slipping with its wheels being locked due to excessive braking force during braking, known as "skid condition", comprises two Doppler radars including respective transmitting and receiving antennae. The radars are provided on the body of the vehicle at the same angle of declination relative to a plane parallel to the bottom surface of the vehicle body. One of the radars is directed down-forward and the other is directed down-backward. A signal component proportional to the pitch angle of the body of the vehicle during deceleration may be sensed by combining two signals produced by the two radars. The excessive braking force is controlled by the signal component.

7 Claims, 7 Drawing Figures

3,918,058

VEHICLE SKID CONTROL SYSTEM

BACKGROUND OF THE INVENTION

The present invention relates to a vehicle skid control system. More particularly, the invention relates to a skid control system wherein skid conditions produced during emergency braking are sensed as a signal component proportional to the pitch angle of the vehicle during deceleration by means of Doppler radar and excessive braking force is controlled by the signal component.

Conventional anti-skid control systems which prevent a vehicle from slipping with its wheels locked due to excessive braking force during emergency braking, known as "skid condition", are known. In such known systems, braking control is undertaken as follows. In a first system, the braking force is controlled by an acceleration meter. In a second system, the braking force is controlled by the speed of the drive shaft, or the sensing of the revolutions of the wheels. If the vehicle slows down, during braking, beyond a specified deceleration of the wheels, the braking force is controlled as a result of calculation involving differentiation. In a third system, the slipping ratio is sensed by the difference between the speed of rotation of the wheels and the speed of the vehicle. The braking force is controlled within the specified level range.

The known systems have drawbacks. The first system cannot be freed from the effect of gravity acceleration on an uphill or downhill road. This results in erroneous operation and susceptibility to vibrations. The second system, although it is the most popular skid control system, is considerably restricted in its braking conditions, since the braking force is released only when the specified deceleration signal is generated. Thus, for example, under the condition in which the friction coefficient between the tires and the road surface differs considerably, such as on concrete and frozen roads, the optimum braking effect cannot be obtained. The third system is the most reliable one in principle. However, it is very difficult from a practical point of view to sense the accurate speed of a vehicle. Furthermore, the system is expensive in manufacture, because it operates as a type of computer.

An object of the invention is to provide a vehicle skid control system which is inexpensive in manufacture.

Another object of the invention is to provide a vehicle skid control system which is effective, efficient and highly reliable in operation.

Still another object of the invention is to provide a vehicle skid control system utilizing Doppler radar as the skid condition detector.

BRIEF SUMMARY OF THE INVENTION

In order to detect the speed of the vehicle, a ground speedometer utilizes the Doppler effect. The ground speedometer is a two beam system, in order to compensate for error in the Doppler signal caused by the pitching movement of the vehicle. To be more practical, two Doppler radars including respective transmitting and receiving antennae, are provided with different mounting angles relative to the road, at the front and rear. The two Doppler signals produced by the two radars are combined or added to successfully eliminate the signal component proportional to the pitch angle in a pitching movement of the vehicle. The Doppler signal contains to a considerable extent a signal component proportional to the pitch angle of the vehicle, so that the vehicle skid control system of the invention is capable of detecting the decleration conditions of the vehicle by positively utilizing such signal component and, at the same time, controlling an excessive braking force due to such signal component.

The vehicle skid control system of the invention prevents skidding of a vehicle caused by excessive braking force. The vehicle has braking means including a brake pedal whereby braking force is applied. The pitch angle of the vehicle varies with the braking force and with the deceleration of the vehicle. The vehicle skid control system comprises a pitch angle detector mounted on the vehicle for detecting a variation in the pitch angle of the vehicle in deceleration. A control device is coupled between the pitch angle detecting means and the braking means for reducing the braking force when the pitch angle exceeds a predetermined level. The pitch angle detector comprises radar means.

The pitch angle detector comprises a pair of radar units mounted on the bottom of the vehicle, one of the radar units having a transmitting and receiving antenna at a predetermined angle of declination relative to a plane parallel to the bottom of the vehicle and directed downward and forward and the other of the radar units having a transmitting and receiving antenna at the predetermined angle of declination relative to the plane and directed downward and backward.

Each of the radar units is a Doppler radar unit.

Each of the Doppler radar units produces a Doppler signal. The pitch angle detector further comprises means for combining the signals produced by the radar units to produce a signal component proportional to the pitch angle of the vehicle during deceleration, and means for supplying the signal component to the control means to reduce the braking force.

The control device comprises level comparison means for comparing the levels of signals supplied thereto, integrating circuit means for integrating a signal supplied thereto and signal dividing means for dividing the signal component into two signals, supplying one of the divided signals directly to the level comparison means and supplying the other of the divided signals to the level comparison means via the integrating circuit means whereby the level comparison means compares the levels of the signals supplied thereto and determines the coincidence point of the levels of the divided signals and produces an output signal in accordance with the comparison. The control means further comprises actuator means coupled in the braking fluid pressure system of the braking means for varying the fluid pressure applied to the brakes of the vehicle thereby varying the braking force. The output signal of the level comparison means is supplied to the actuator means to control the operation thereof.

The control device comprises level comparison means for comparing the levels of signals supplied thereto, potentiometer means connected to the level comparison means for providing a signal voltage corresponding to a predetermined standard pitch angle and means for supplying the signal component directly to the level comparison means whereby the level comparison means compares the levels of the signal component and the signal voltage and determines the coincidence point of the levels of the signal component and the signal voltage and produces an output signal in accordance with the comparison, and wherein the control device further comprises actuator means coupled in the braking fluid pressure system of the braking means for varying the fluid pressure applied to the brakes of the vehicle thereby varying the braking force, and means for supplying the output signal of the level comparison means to the actuator means to control the operation thereof.

BRIEF DESCRIPTION OF THE DRAWINGS

In order that the invention may be readily carried into effect, it will now be described with reference to the accompanying drawings, wherein.

In the FIGS., the same components are identified by the same reference numerals.

DETAILED DESCRIPTION OF THE INVENTION

Figure 1:
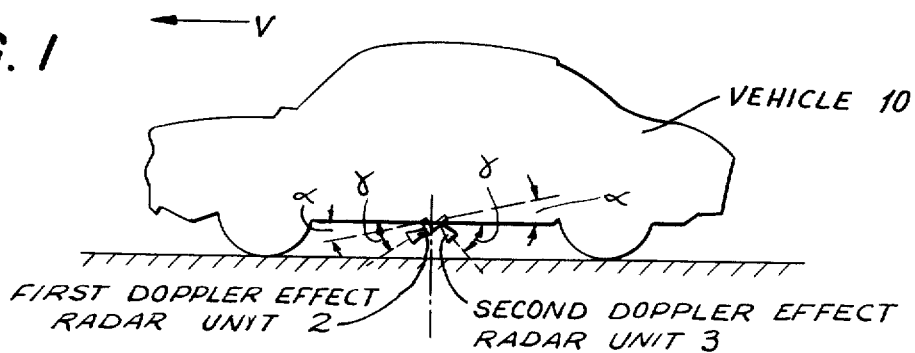
FIG. 1 is a schematic diagram of the vehicle skid control system of the invention mounted on a vehicle.

The vehicle skid control system of the invention comprises two radars or radar units 2 and 3 (FIG.1), which operate in accordance with the Doppler effect. The radar units 2 and 3 are mounted in the center, under the body of the vehicle 10 at a predetermined angle in the front and the rear. The radar units 2 and 3 are mounted, for example, at an angle of depression of 60° and transmit respective high frequency signals to the road surface and receive each signal reflected from the surface of the road. In this case, as disclosed, the received reflected signals are converted into a signal proportional to the speed of the vehicle. That is, the received reflected signals are converted into Doppler frequencies $fd1$ and $fd2$.

When the frequency of both transmitted high frequency radar signals is expressed by $f$, the speed of the vehicle is $V$, the angle of depression of the antennae of the radar units 2 and 3 is $\gamma$, the gradient or pitch angle of the vehicle 10 is $\alpha$, and the velocity of propagation is $C$, the Doppler frequencies $fd1$ and $fd2$ may be expressed by the equations $$fd1 = (f) \frac{2V \cos(\gamma - \alpha)}{C} \quad (1)$$

$$fd2 = (f) \frac{2V \cos(\gamma + \alpha)}{C} \quad (2)$$

Equations (1) and (2) may be converted as follows:

$$fd1 = (f) \frac{2V}{C}(\cos \gamma \cos \alpha + \sin \gamma \sin \alpha) \quad (3)$$

$$fd2 = (f) \frac{2V}{C}(\cos \gamma \cos \alpha - \sin \gamma \sin \alpha) \quad (4)$$

Therefore, if Equation (4) is subtracted from Equation (3) the difference is $$fd1 - fd2 = f \frac{4V}{C} \sin \gamma \sin \alpha = f\alpha \quad (5)$$

Here, since the radar units are affixed to the body of the vehicle 10, the value of $\sin \gamma$ becomes constant. Therefore, the magnitude $f\alpha$ in Equation (5) includes a frequency component proportional to the value of $\sin \alpha$ determined by the pitch angle of the vehicle.

For reference, if the system is used as a speedometer, the two signals are added in order to eliminate the frequency component of the pitch angle $\alpha$.

It is well known that the declaration of the vehicle 10 appears in the pitch angle $\alpha$ as the load to the front wheels. Therefore, it is apparent that the signal $f\alpha$, determined in the aforedescribed manner, corresponds to the declaration during the braking operation.

Figure 2:
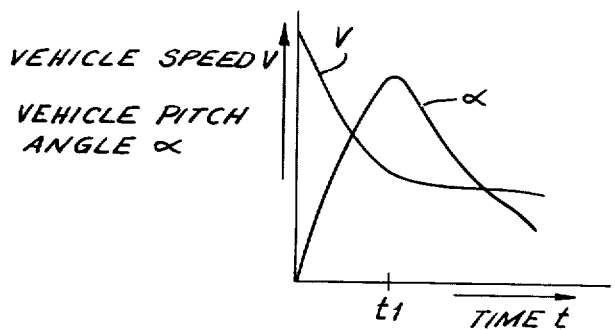
FIG. 2 is a graphical presentation of the vehicle speed and pitch angle relative to time.

If it is assumed that emergency braking is effected during the movement of the vehicle, the variations of the speed V of the vehicle and the pitch angle $\alpha$ of the vehicle relative to the time $t$ are shown by the curves of FIG. 2. That is, when the pitch angle $\alpha$ of the vehicle starts to decrease at the time $t1$, the deceleration of the vehicle becomes almost constant at such time. In other words, the vehicle does not slow down normally despite normal braking. The vehicle thus continues to slip after the time t1 with the wheels being locked. This is called a skid condition. As hereinbefore explained, since the braking force becomes maximum when the pitch angle $\alpha$ becomes maximum, it is apparently theoretically possible to minimize the braking distance by so controlling the braking force that the vehicle is stopped in a condition in which the pitch angle $\alpha$ is kept in the vicinity of the peak point.

The present invention discloses a system for preventing a skid condition caused by too much early locking of wheels, by controlling the excessive braking force by utilizing the signal component $f\alpha$.

Figure 3:
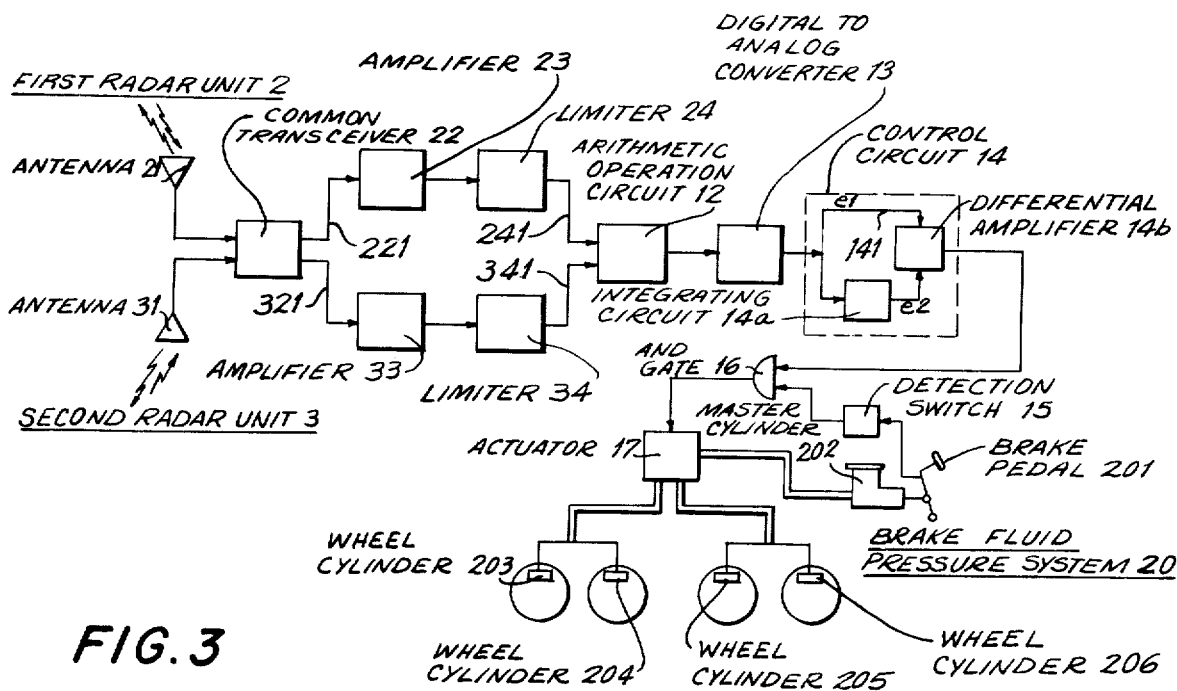
FIG. 3 is a block diagram of an embodiment of the vehicle skid control system of the invention.

FIG. 3 illustrates the vehicle skid control system of the invention. In FIG. 3, the two Doppler radar units 2 and 3 comprise transmitting and receiving antennae 21 and 31, a common tramsmitter and receiver or transceiver 22, amplifiers 23 and 33 and limiters 24 and 34. The transceiver 22 comprises a Gunn diode which is commonly used as an osicllator and mixer and at the same time is designed for dual transmitting and receiving purposes. Therefore, the two Doppler frequencies $fd1$ and $fd2$ appear at the output leads 221 and 321. The Doppler frequencies $fd1$ and $fd2$ are supplied to the amplifiers 23 and 33, respectively, and to the limiters 24 and 34, respectively, and are then converted into the square waveforms having a specific fixed amplitude.

The outputs of the limiters 24 and 34 are supplied to an arithmetic operation circuit 12 via output leads 241 and 341, respectively. The arithmetic operation circuit 12 comprises a mixer similar to that used in a heterodyne receiver, for example, and extracts the pulse signal $f\alpha$ proportional to the pitch angle of the vehicle by comparing the frequencies of the two square waves.

The pulse signal $f\alpha$ is then converted into an analog signal by a digital to analog converter 13 and the analog signals are supplied to an actuator 17 inserted in the brake fluid pressure system 20 via a control circuit 14. The control circuit 14 produces two signals having slight time difference relative to the analog output from the digital to analog converter 13 and compares the two signals to determine the cross point. For this purpose, the control circuit 14 comprises an integrating circuit 14a and a differential amplifier 14b. The time constant of the integrating circuit 14a is kept small and its output signal, which is the second signal voltage, is slightly delayed rather than that appearing at an output lead 141, which is the first signal voltage.

Figure 4:
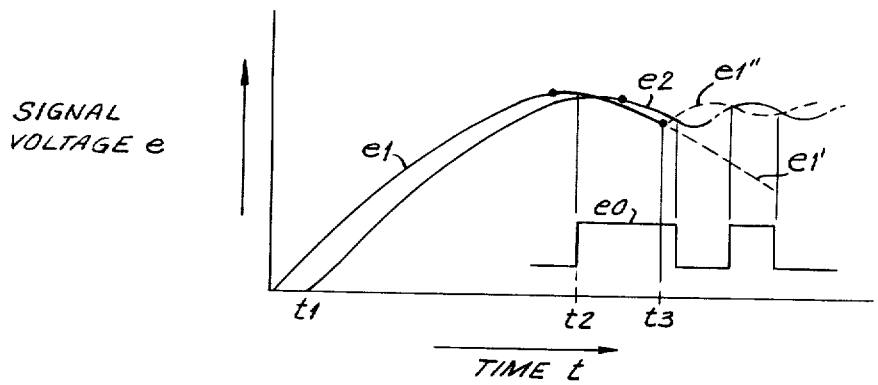
FIG. 4 is a graphical presentation of the first signal voltage e1 and the second signal voltage e2 of the vehicle skid control system of FIG. 3 relative to time.

FIG. 4 shows the variation of the first signal voltage $e1$ and the second signal voltage $e2$ of the control circuit 14 relative to time $t$. In FIG. 4, the time difference $t1$ is always set by the time constant of the integrating circuit 14a (FIG. 3) and the signal voltages $e1$ and $e2$ are maintained in a relation to increase or decrease in accordance with the variations of the pitch angle $\alpha$ of the vehicle 10.

FIG. 4 clearly indicates that the waveforms of the first signal voltage $e1$ and the integrated second signal voltage $e2$ cross each other at the time $t2$ in the vicinity of the peak point of the pitch angle $\alpha$ of the vehicle. Therefore, it is sufficient, in order to obtain the detection output command signal $e0$, to detect the time of coincidence of the two signal voltages by comparing the signals $e1$ and $e2$ in the differential amplifier 14b (FIG. 3).

Thus, when the braking fluid pressure is somewhat released by operating the actuator 17 (FIG. 2) with the detected output voltage $e0$, the tendency to decrease, shown by the broken line curve $e1'$ of FIG. 4, at the time $t3$ of the first signal voltage $e1$, may be blocked and turned into a tendency to increase, as shown by the broken line $e1''$. The operation is repeated until the vehicle movement stops. This results in the control of the braking fluid pressure to provide optimum braking force during the anti-skid conditions of operation of the vehicle.

In addition, since the pitch angle $\alpha$ of the vehicle 10 is always determined by the Doppler radar units, not only during braking, but also during movement of the vehicle, a detection switch 15 (FIG. 3) is provided on the brake pedal 201 (FIG. 3) to prevent erroneous operation of the actuator 17 due to causes other than braking, such as, for example, transfer of the load.

Furthermore, facilities are provided to permit the operation of the actuator 17 only when both signals exist, and the output signal of the detection switch 15 and the output signal of the control circuit 14 are detected by an AND circuit 16, provided for such purpose.

Figure 5A:
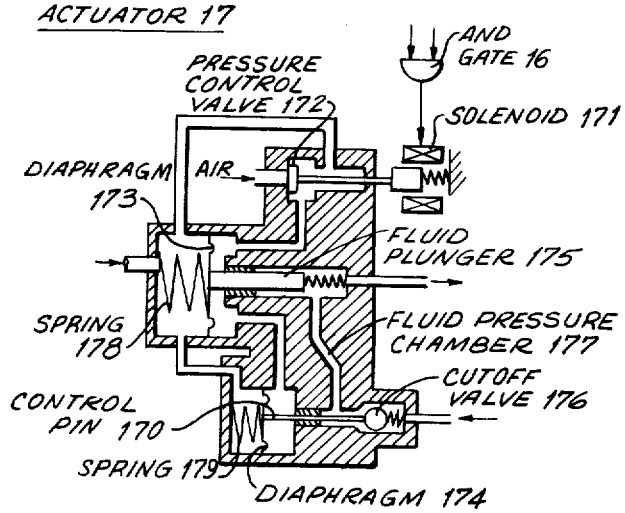
FIGS. 5a and 5B are schematic diagrams of an embodiment of the actuator of the vehicle skid control system of FIG. 3 in different conditions of operation.
Figure 5B:
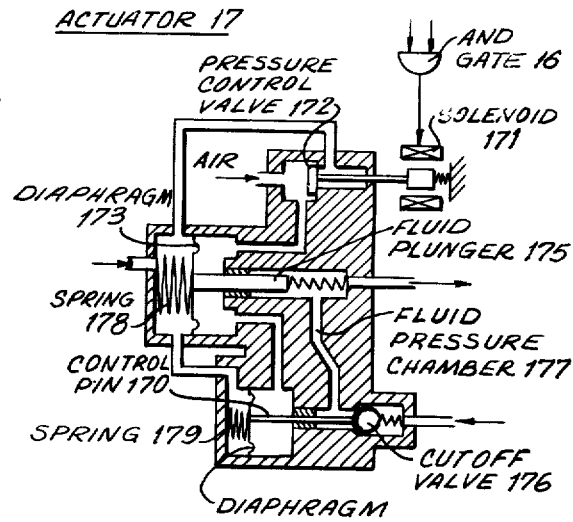

FIGS. 5a and 5b illustrate the operation of the actuator 17. In FIGS. 5a and 5b, the actuator 17 comprises a control pin 170, a solenoid 171, a positive/negative pressure control valve 172, two diaphragms 173 and 174, a fluid plunger 175, a fluid pressure cutoff valve 176, and a fluid pressure chamber 177. The diaphragm 174 is coupled to the control pin 170 and such diaphragm and pin move together. When the output of the AND gate 16, which is the fluid pressure release signal, is not supplied during braking, the braking pressure from the master cylinder is directly transferred to the wheel cylinder through the routes shown in FIG. 5a.

When the fluid pressure release signal is supplied by the AND gate 16, the solenoid 171 is magnetized, as shown in FIG. 5b, thereby attracting the positive/negative pressure control valve 172. Air pressure is then led to the valve 172, which is moved to the right. Therefore, air pressure is applied to the right side chambers of the diaphragms 173 and 174, and springs 178 and 179 are compressed. As a result, the fluid cutoff valve 176 closes the fluid path due to the fluid pressure from the master cylinder 202. At the same time, the fluid plunger 175 moves to the left as much as the degree of compression of the spring 178 permits, so that the fluid chamber 177 also increases its capacity, thereby correspondingly decreasing the internal fluid pressure. The fluid pressure in the wheel cylinder may be controlled by the command signal of the AND gate 16. Wheel cylinders 203, 204, 205 and 206 are shown in FIG. 3.

The operation of the vehicle skid control system of the present invention is as follows. As shown in FIG. 1, if the driver applies excessive force to the brake pedal 201 for an emergency stop while driving the vehicle, two high frequency beams are directed to the road surface. The brake fluid pressure system 20, and especially the actuator 17, encounters the operating conditions shown in FIG. 5a and provides a large braking force, causing deceleration of the vehicle. The vehicle will thus pitch forward to a considerable extent. The pitch angle $\alpha$ is detected by the Doppler radar units in succession to indicate the existence or non-existence of a vehicle skid condition.

When the pitch angle $\alpha$ reaches its peak, the differential amplifier 14b of the control circuit 14 detects such condition and produces the command signal for releasing the fluid pressure. At such time, the detection switch 15 is turned ON. The AND gate 16 is thereby operated upon receiving the signals from the differential amplifier 14b and the detection switch 15. As a result, the solenoid 171 of the actuator 17 is magnetized. As hereinbefore mentioned, when the solenoid is magnetized, since the positive/negative pressure control valve 172 is attracted, as shown in FIG. 5b, the fluid plunger 175 and the control pin 170 are drawn backward. As a result, the braking fluid pressure in the fluid pressure chamber 177 is reduced. This is followed by reduction of the braking force to the wheels, thus preventing the skid condition of the vehicle.

In succession, when the braking force is reduced, the speed of rotation of the wheels increases, producing an increment of the pitch angle $\alpha$ of the vehicle. Therefore, the signal from the differential amplifier 14b disappears, releasing the activation of the solenoid 171. Thus, the fluid plunger 175 and the control pin 170 are restored to their position indicated in FIG. 5a. Then, the braking force is again increased, causing the vehicle to slow down. This operation is repeated, as required.

Although it is obvious, the vehicle skid control system of the invention is not restricted to the application example hereinbefore mentioned. Thus, for example, it is also possible that, first, the pitch angle $\alpha$ which is evident for an idealistic braking force, that is, the maximum braking force, is applied to the wheels running on the road under specific conditions, is memorized as the standard pitch angle $\alpha 0$. Then, if the actual pitch angle $\alpha$, which may be observed under other braking conditions, coincides with the standard pitch angle $\alpha 0$ as a result of comparison, the braking fluid pressure releasing signal is supplied to the actuator 17.

Figure 6:
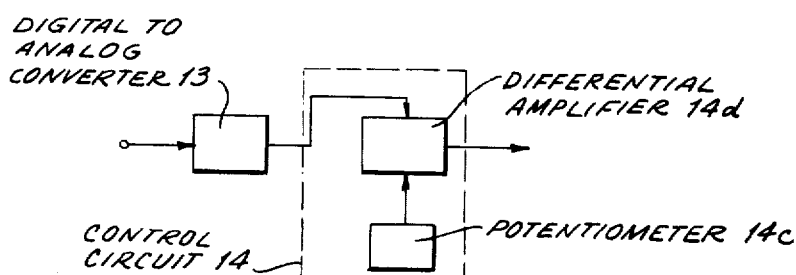
FIG. 6 is a block diagram of another embodiment of the control circuit of the vehicle skid control system of FIG. 3.

This concept is explained in greater detail with reference to FIG. 6. In the embodiment of FIG. 6, the control circuit 14 for the actuator 17 comprises a potentiometer 14c and a differential amplifier 14d. The voltage of the signal $f\alpha$ supplied from the digital to analog converter 13 (FIG. 3) in proportion to the pitch angle α is compared in level with the signal voltage corresponding to the standard pitch angle α0 previously set by the potentiometer 14c. When the point at which the two signal levels cross is detected, the control circuit 14 produces the command signal for the actuator 17.

It is also possible to extract the DC voltage of the signal fα corresponding to the pitch angle by applying the two Doppler signals fd1 and fd2, to be combined in the arithmetic operation circuit 12, to said arithmetic operation circuit after first converting them into the DC voltages. In this case, in the circuit of FIG. 3, it is enough to add a detector to the output of each of the limiters 24 and 34, and to remove the digital to analog converter 13. An operational amplifier may be utilized as the arithmetic operation circuit 12, for example.

As is obvious from the foregoing description, since the skid control system of the invention detects the deceleration, using a Doppler signal of a ground speedometer, the system is produced inexpensively and economically and secures accurate operation irrespective of the type of vehicle on which the Doppler radar units are mounted.

While the invention has been described by means of specific examples and in specific embodiments, we do not wish to be limited thereto, for obvious modifications will occur to those skilled in the art without departing from the spirit and scope of the invention.

Claims

We claim:

1. A vehicle skid control system for preventing skidding of a vehicle caused by excessive braking force, the vehicle having braking means including a brake pedal whereby braking force is applied, the pitch angle of the vehicle varying with the braking force and with the deceleration of the vehicle, said vehicle skid control system, comprising.

gravity independent pitch angle detecting means mounted on the vehicle for detecting a variation in the pitch angle of the vehicle in deceleration; and control means coupled between the pitch angle detecting means and the braking means for reducing the braking force when the pitch angle exceeds a predetermined level.

2. A vehicle control system as claimed in claim 1, wherein the pitch angle detecting means comprises radar means.

3. A vehicle skid control system as claimed in claim 1, wherein the pitch angle detecting means comprises a pair of radar units mounted on the bottom of the vehicle, one of the radar units having a transmitting and receiving antenna at a predetermined angle of declination relative to a plane parallel to the bottom of the vehicle and directed downward and forward and the other of the radar units having a transmitting and receiving antenna at the predetermined angle of declination relative to the plane and directed downward and backward.

4. A vehicle skid control system as claimed in claim 3, wherein each of the radar units is a Doppler radar unit.

5. A vehicle skid control system as claimed in claim 4, wherein each of the Doppler radar units produces a Doppler signal and wherein the pitch angle detecting means further comprises means for combining the signals produced by the radar units to produce a signal component proportional to the pitch angle of the vehicle during deceleration, and means for supplying the signal component to the control means to reduce the braking force.

6. A vehicle skid control system as claimed in claim 5, wherein the control means comprises level comparison means for comparing the levels of signals supplied thereto, integrating circuit means for integrating a signal supplied thereto and signal dividing means for dividing the signal component into two signals, supplying one of the divided signals directly to the level comparison means and supplying the other of the divided signals to the level comparison means via the integrating circuit means whereby the level comparison means compares the levels of the signals supplied thereto and determines the coincidence point of the levels of the divided signals and produces an output signal in accordance with the comparison, and wherein the control means further comprises actuator means coupled in the braking fluid pressure system of the braking means for varying the fluid pressure applied to the brakes of the vehicle thereby varying the braking force, and means for supplying the output signal of the level comparison means to the actuator means to control the operation thereof.

7. A vehicle skid control system as claimed in claim 5, wherein the control means comprises level comparison means for comparing the levels of signals supplied thereto, potentiometer means connected to the level comparison means for providing a signal voltage corresponding to a predetermined standard pitch angle and means for supplying the signal component directly to the level comparison means whereby the level comparison means compares the levels of the signal component and the signal voltage and determines the coincidence point of the levels of the signal component and the signal voltage and produces an output signal in accordance with the comparison, and wherein the control means further comprises actuator means coupled in the braking fluid pressure system of the braking means for varying the fluid pressure applied to the brakes of the vehicle thereby varying the braking force, and means for supplying the output signal of the level comparison means to the actuator means to control the operation thereof.

* * * * *